Nov. 15, 1960   C. WACHTEL   2,960,180
SAFETY SWING
Filed Sept. 19, 1958
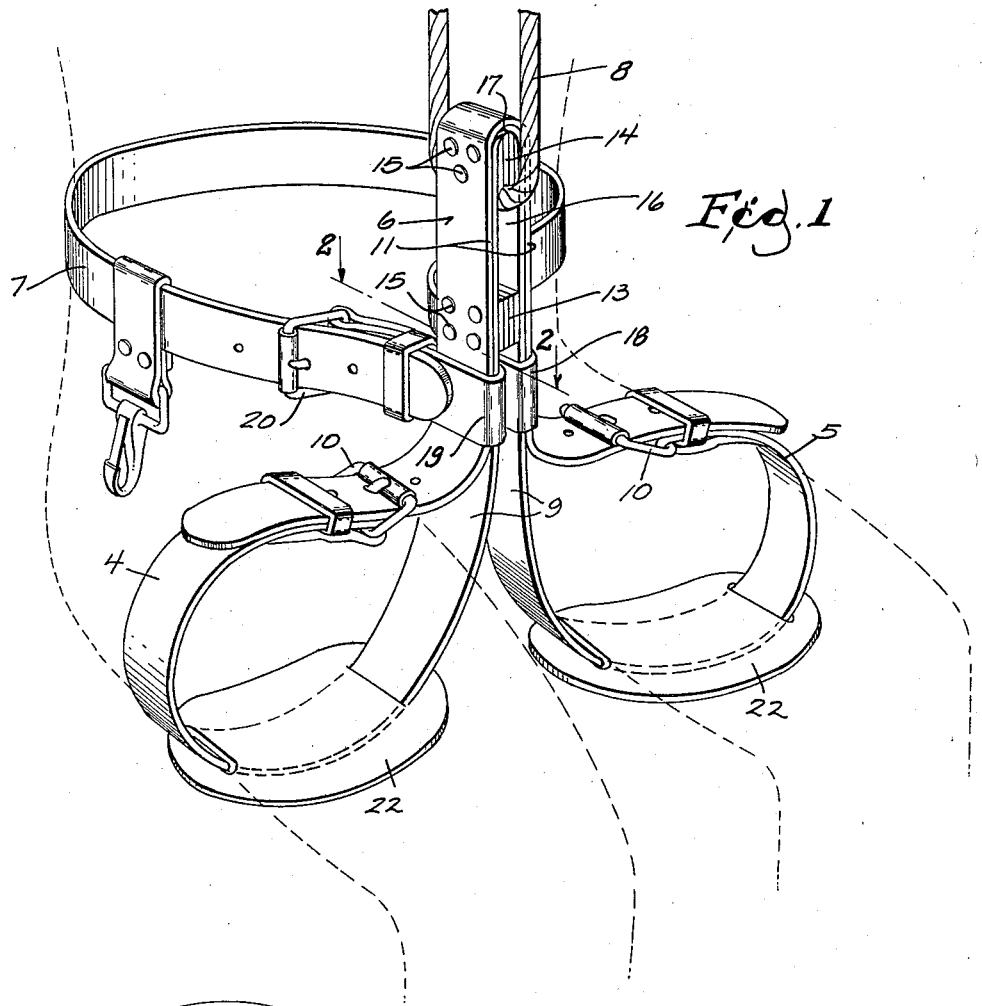
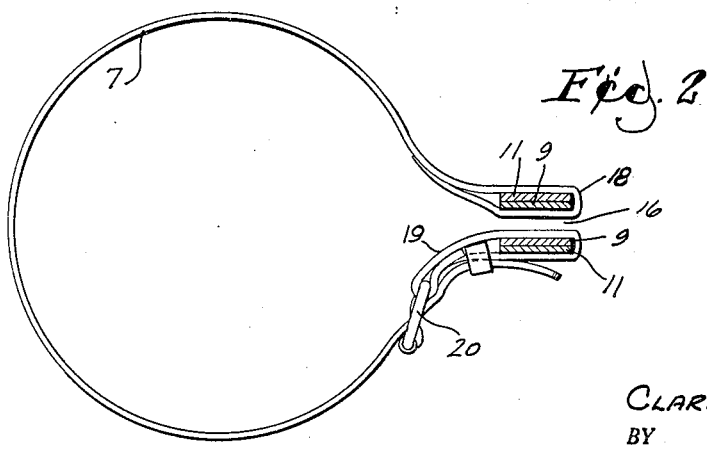
INVENTOR.
CLARENCE WACHTEL
BY
Lieber, Lieber & Nilles
ATTORNEYS

United States Patent Office 2,960,180
Patented Nov. 15, 1960

2,960,180

SAFETY SWING

Clarence L. Wachtel, 611 Maywood Ave.,
Wauwatosa 13, Wis.

Filed Sept. 19, 1958, Ser. No. 762,055

1 Claim. (Cl. 182—3)

The present invention relates to climber's swings which are used, for example, by tree surgeons with a swing rope to facilitate climbing.

The invention is in the nature of an improvement over the subject matter of my United States Patent No. 2,252,998, issued August 19, 1941, and entitled, "Safety Swing."

Swings of this character must be attached to the body of the climber so as to permit complete freedom of movement, comfort for the wearer, provide complete safety in use and should also be as light in weight as possible. It is accordingly an object of this invention to provide a climber's swing having these characteristics.

A general object of the invention is to provide a safety swing harness seat of the above type which is particularly simple in construction, efficient in use and economical to manufacture.

These and other objects and advantages of the invention will appear later as this disclosure progresses, reference being had to the accompanying drawings in which:

Figure 1 is a perspective view of a swing made in accordance with the present invention; and Figure 2 is a fragmentary sectional view, on an enlarged scale, taken on line 2—2 of Figure 1.

Referring more particularly to the drawings, the swing includes the leg loops 4 and 5, an inverted U-shaped upstanding suspension shank 6 intermediate the leg embracing loops, and a body-encircling loop or belt 7. A swing suspension rope 8 is trained through the shank 6 and is fastened to a tree or the like (not shown) for supporting the climber.

The leg loops 4 and 5 and shank 6 are formed by the heavy leather strap 9 which defines the major portions of these loops and the inner layer of the shank 6. The extreme opposite ends of strap 9 have buckles 10 secured thereto. Another strap 11 forms the remaining minor portion of the leg loops and extends upwardly to form the outer portion of the shank. The lower ends of strap 11 are adjustably engaged by their respective buckles 10, and the loops 4 and 5 are disposed substantially in a common vertical plane passing longitudinally through the upstanding shank 6.

The shank contains a spacer 13 and guide block 14 which are secured in the shank by rivets 15 extending through all the belt layers of the shank. The shank so formed is very rigid and provides an opening 16 through which the swing rope is passed. The rope bears against the lower curved side of the guide block.

The leg loops and shank form an integral structure or harness without the necessity of strap slides, metal frames, loop snaps or other fastening devices to fasten them together. The one-piece shank and leg-loop structure is formed in effect by a double layer of rather stiff straps folded over at their medial portions to define the shank. The double layer of straps is separable at its lower ends to form the leg loops. The inner strap layer at the upper end of the shank may be severed as shown at 17 in order that shorter pieces of belt may be used in forming the harness. The outer strap is preferably of one piece at the upper end of the shank to provide a smooth end of pleasing appearance and which will not irritate the wearer. As mentioned, however, this shank and leg-loop harness is in effect a relatively rigid one-piece unit.

The body-encircling belt 7 is attached to the integral shank-leg loop structure at a point below the spacer 13 and directly to the double layer formed by straps 9 and 11, as follows. One end of belt 7 is formed as a loop 18 which embraces and is slidably adjustable on the straps 9 and 11 at a point above one leg loop. Just above the other leg loop is an attaching loop 19 which is also adjustable on the straps 9 and 11, and which has a buckle 20 at its free end. The other end of the belt 7 is adapted to be engaged by this buckle after the belt 7 has been placed around the waist of the climber.

The weight of the climber is supported primarily by the shank-leg-loop structure and pads 22 are slidable on belt 9 at the lower portion of each leg loop so as to prevent the belt from digging into the back of the climber's legs.

The waist belt 7 is adjustable vertically within limits on the shank-leg-loop structure to provide a comfortable fit for the climber.

To use the swing provided by this invention, the legs are inserted in the leg loops and pulled up high on the wearer's thighs. The belt 7 is then passed around the waist of the wearer and engaged by the buckle 20. The belt 7 is adjusted on the shank in a vertical direction so as to comfortably fit the wearer.

The rope supports the swing and its wearer and permits complete freedom of movement without any binding or discomfort to the wearer. A simple safety swing harness seat has been provided in which much hardware found in conventional swings has been eliminated. With the elimination of many joints and fastenings, which are always subject to failure, a safer belt has been provided.

Various modes of carrying out the invention are contemplated as being within the scope of the following claim particularly pointing out and distinctly claiming the subject matter which is regarded as the invention.

I claim:

A climber swing for a swing suspension rope comprising, inner and outer straps each having a curved medial portion of inverted U-shape and firmly united to form a rigid upstanding shank for the swing suspension rope, the opposite end portions of said inner strap extending downwardly and outwardly away from the lower shank end and having their extreme ends directed inwardly toward said end to provide occupant leg embracing loops substantially disposed in a common vertical plane passing longitudinally through the shank, and the opposite end portions of said outer strap extending outwardly away from said lower shank end in said plane and above said loops and having their extreme ends formed for adjustable attachment to the adjacent inner strap ends to vary the size of the loops, and a two-piece occupant body encircling belt, each piece of said belt having a loop end embracing and slidable along both layers of said straps at the lower portion of said shank while the opposite ends of said pieces are formed for adjustable attachment to each other to vary the belt girth.

References Cited in the file of this patent

UNITED STATES PATENTS

| | | |
|---|---|---|
| 1,642,911 | Thurnau | Sept. 20, 1927 |
| 1,721,516 | Jacobs | July 23, 1929 |
| 1,775,736 | Rose | Sept. 16, 1930 |
| 2,252,998 | Wachtel | Aug. 19, 1941 |